United States Patent [19]

Pikora

[11] Patent Number: 4,633,591
[45] Date of Patent: Jan. 6, 1987

[54] DIGITAL IMAGE PROPORTION ANALYZER

[76] Inventor: Alfred J. Pikora, 6420 Colechester Ct., Centerville, Ohio 45459

[21] Appl. No.: 792,282

[22] Filed: Oct. 28, 1985

[51] Int. Cl.$^4$ .............................................. B43L 7/00
[52] U.S. Cl. ...................................... 33/452; 33/464; 33/DIG. 9
[58] Field of Search .................. 33/1 K, DIG. 9, 448, 33/468, 427, 452, 464, 452

[56] References Cited

U.S. PATENT DOCUMENTS 3,878,615 4/1975 Peterson .......................... 33/DIG. 9
4,417,399 11/1983 Baliozian ......................... 33/DIG. 9

Primary Examiner—Harry N. Haroian
Attorney, Agent, or Firm—Donald P. Gillette

[57] ABSTRACT

A magnification calculator has a main member and a second member that moves to selected positions along the main member. One of the members has a first set of indicia, each element of which corresponds to one of the selected positions. The other member has a first reference indicator to indicate the element chosen, which is the dimension of a selected space in which a reproduction of a selected artwork portion is to be printed. The calculator includes two edge indicators on the main member, one at a fixed location and the other slidable on the main member. The second member has a second set of indicia divided into subsets, each corresponding to an element of the first set of indicia. Setting the second member so that the first reference indicator points to the element in the first set that is the measure of the one dimension of the selected space, and aligning the edge indicators with opposite edges of the artwork portion places a second reference indicator on the movable edge indicator in alignment with the element of the second set of indicia that is the proper magnification value to make the reproduction fit in the selected space.

20 Claims, 8 Drawing Figures

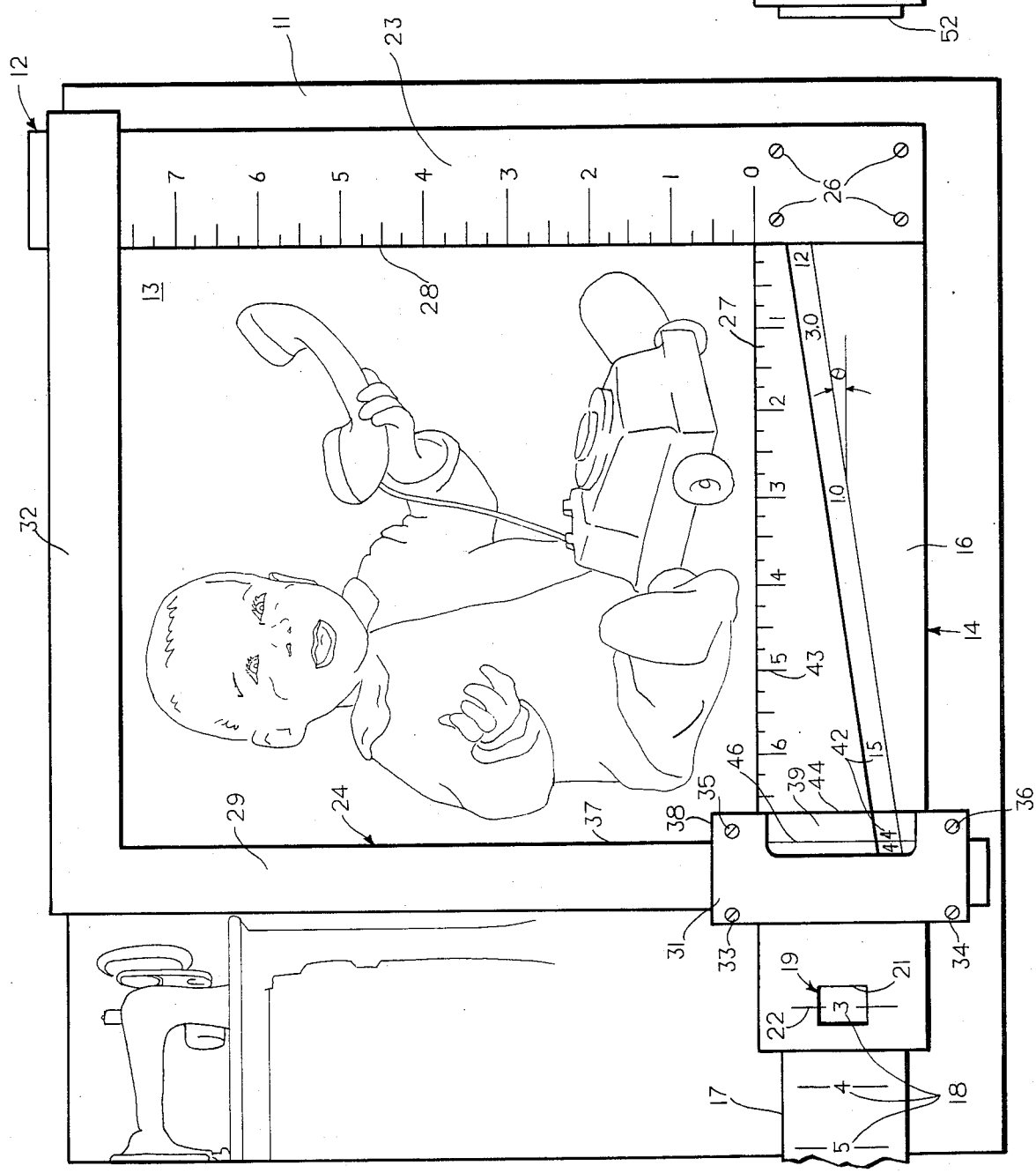
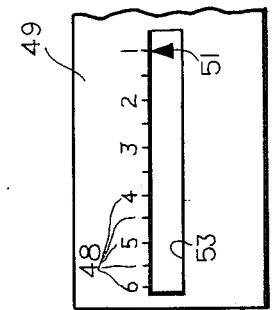
FIG. 1
FIG. 2

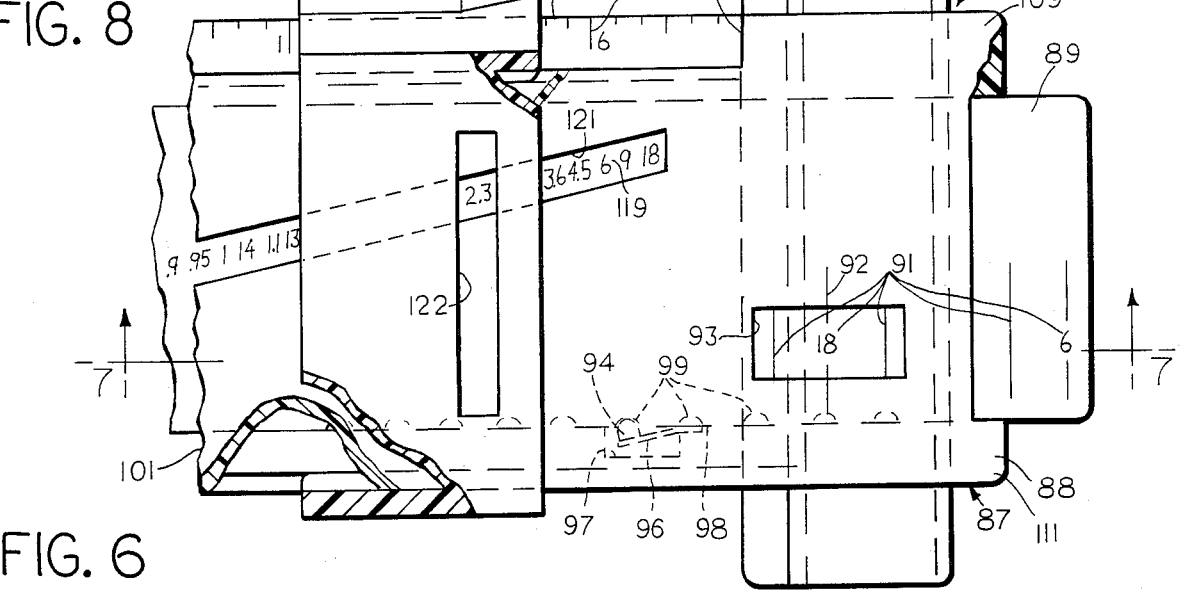

4,633,591

DIGITAL IMAGE PROPORTION ANALYZER

BACKGROUND OF THE INVENTION

This invention relates to a device for calculating the ratio by which a selected part of a given piece of artwork is to be reduced or enlarged in reproducing it so that the reproduction will just fit in a space set aside for that purpose on a page. In particular, the device analyzes the proportion of the size of the selected part, compares it with the size of the space set aside, and gives a numerical readout of the proportion, or magnification ratio, between the two size values.

Printed pages frequently include such artwork as photos, drawings, and graphs alongside or embedded in related textual material printed in columns separated by narrow blank areas. The artwork area can be of any size but is frequently related to the column width. Instead of simply arranging to print the artwork in the same size space as the original artwork, the person laying out the page usually has to measure the original artwork, or the portion to be reproduced, and calculate the optical enlargement or reduction necessary to make the reproduction fit properly in the selected space. The selected portion is marked to indicate its boundaries, and the marked artwork, together with the enlargement or reduction ratio, is given to the person responsible for making the photographic reproduction thereof to be used in the printing process.

Instead of using the entire phrase "enlargement or reduction" hereinafter, the word "magnification" will be used, with the understanding that magnification greater than unity is enlargement and magnification less than unity is reduction. The magnification is represented by a number determined by the ratio of the area covered by the reproduced part of the artwork to the area of that part of the original artwork, and when the artwork, marked to indicate the desired part, is given, along with the magnification value, to someone responsible for making the reproduction, it is a straightforward matter to make the reproduction for inclusion in the final layout.

A further thing must be understood. While the same magnification will be applied to both the horizontal and vertical dimensions of that part of the artwork to be reproduced, the selection of the magnification value is based on only one of those dimensions, usually the horizontal dimension. Different magnification values for the two dimensions is almost never permissible, and the person making the layout must keep that in mind in allocating space on the page and in marking the part of the initial artwork to be reproduced. Some accommodation may be made by cropping the final reproduction differently than may have originally been planned.

The procedure commonly used up to now in determining the magnification value has been for the person making the layout to mark the initial artwork to indicate at least the corners of the portion to be reproduced. Then, a dimension, usually the width, of that portion is measured and the number representing that value is divided into the same dimension of the space into whloh the reproduction of that portion of the artwork is to fit. The quotient obtained by that division is given to the person who is to make the reproduction, and that quotient is then applied as the magnification value in reproducing the portion of the initial artwork marked by the layout person.

Since the measurement of the selected portion of the original artwork is made with one instrument, usually a ruler, and the calculation of the magnification value is done separately, either as a partly or wholly mental operation or by means of a slide rule or calculator, it is entirely possible for an error to creep into the calculation, either by entering a wrong number or, particularly if the magnification value is computed mentally, by making a mistake in the mathematical operation.

OBJECTS AND SUMMARY OF THE INVENTION

It is one of the objects of this invention to simplify the calculation of the magnification value to be applied to a selected portion of an initial piece of artwork to cause a reproduction of that portion to fit into a desired area. In order to achieve that object, it is a further object to provide a device for measuring one dimension of the selected portion of the artwork and, simultaneously, to calculate the value by which that portion will have to be magnified to fit into the corresponding dimension of the desired area.

A further object of the invention is to provide a measuring device of the aforementioned type with a framing structure to assist the user in visualizing both dimensions of the reproduced portion of the initial artwork.

Still further objects will be apparent from the following description in conjunction with the accompanying drawings.

A magnification calculator may be constructed according to this invention to resemble certain types of slide rules consisting of an elongated main member and a second member, which is typically a slide, engaging the main member to slide longitudinally along it. One of the members has a first reference indicator, such as a cursor or a window, and the other member has a first set of indicia, such as numbers representing one dimension of the reproduced artwork, with the spacing between those numbers being the same as the units of measure used in the printed page into which that artwork is to be incorporated.

The second member has a second set of indicia, each of which is a magnification value, and this second set is divided into subsets, each of which is a row of numbers that are magnification values associated with a corresponding one of the elements of the first set of indicia. Therefore, there is one such row, or subset, for each number, or element, in the first set of indicia. The main member has means for identifying which row is to be used in finding the proper magnification value. For example, such means may be a window in the main member through which only one row at a time of the second set of indicia is visible, and that row is determined by the relative setting of the second member and the main member to bring a particular number in the first set into alignment with the reference indicator. In order to bring a particular row of the second set of indicia into viewing position in the window when the second member is placed in such a longitudinal position with respect to the main member as to align the corresponding number in the first set with the reference indicator, the rows making up the second set are tilted at an angle with respect to the longitudinal direction of the two members, and each row is longitudinally offset with respect to the next adjacent row by a distance equal to the space between the two numbers corresponding to those rows. The window in the main member is also tilted at the same angle.

The calculating device also includes a fixed edge indicator and another edge indicator that is movable along the main member. The range of movement of the movable edge indicator corresponds to the distance that the window extends in the longitudinal direction of the main member, and the movable edge indicator has a second reference indicator, such as a cursor, that points out a location along the window at a point corresponding to the distance between the edge indica- tors.

The invention will be described in greater detail hereinafter with reference to the drawings.

BRIEF DESCRIPTION OF THE DRAWINGS

FIG. 1 shows one embodiment of a device constructed according to this invention for calculating the magnification value by which initial artwork must be enlarged or reduced to fit into a selected space on a page.

FIG. 2 shows a fragment of the slide rule portion of a different embodiment of the device in FIG. 1.

FIG. 6 is a plan view of a further modification of the device in FIG. 1.

FIG. 7 is a cross-sectional view of the device in FIG. 6 along the line 7-7'.

FIG. 8 is an end view of the slide rule portion of the device in FIG. 6.

DETAILED DESCRIPTION OF THE INVENTION

Figure 4:
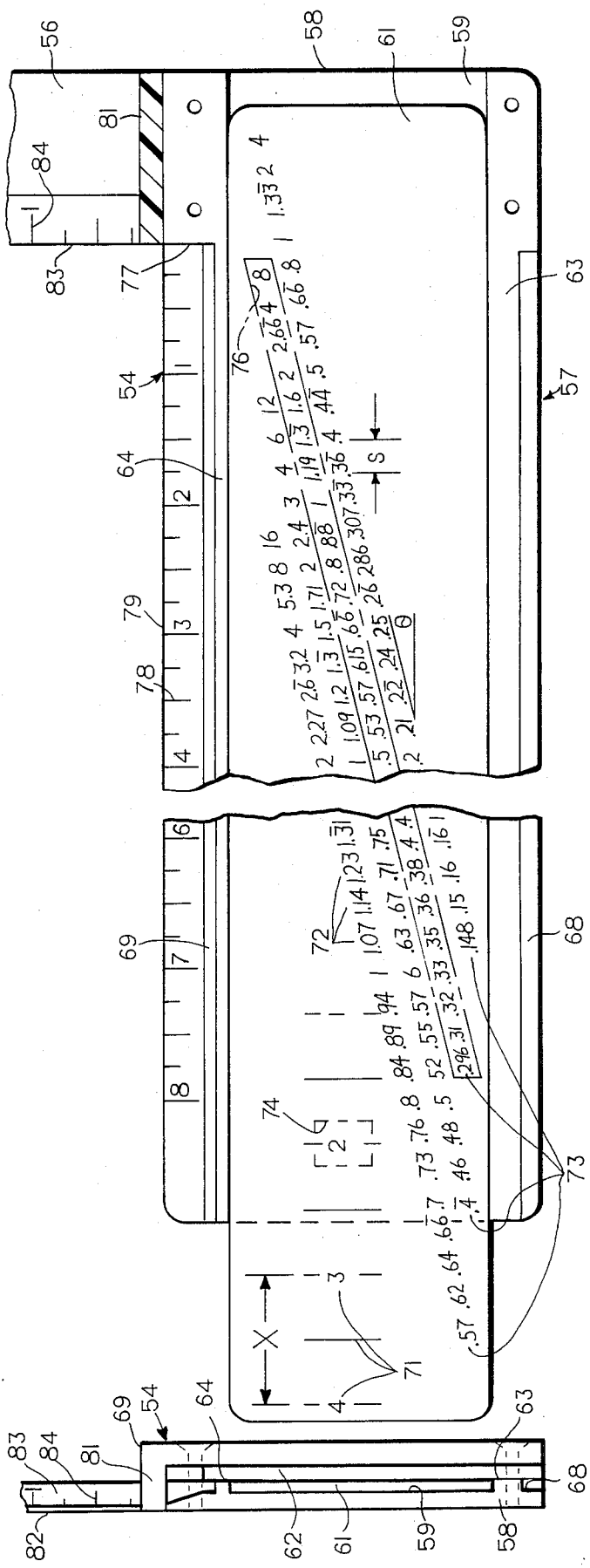
FIG. 4 shows a plan view, partly cross-sectioned, of the device in FIG. 3.

FIG. 1 shows a piece of artwork 11 on which a device 12 has been placed for the purpose of calculating the amount that a selected portion 13 of the artwork would have to be enlarged or reduced to fit neatly into a space set aside for printing a reproduction of that portion. In this instance the artwork happens to be a photograph of an infant with a sewing machine in the background, but in other instances it could be a graph or some other two dimensional subject matter. The portion 13 sometimes includes the entire artwork 11, but FIG. 1 shows that the device 12 has been placed in this particular case to frame only the infant as the subject matter to be reproduced and to eliminate the sewing machine in the background.

The calculating portion of the device 12 is a special type of slide rule 14 that includes an elongated main member 16 and a second elongated member 17 that can be moved longitudinally relative to the main member. One of these members has a first set of indicia 18 that represents one dimension of the selected space in which the reproduction of the portion 13 is to be printed. Usually, but not necessarily, that dimension is the horizontal width of the selected space, and that is the dimension chosen for illustration in FIG. 1. In this embodiment, the elements of the set 18 are printed on the second member 17 and are integers from 1 through 6 corresponding to widths of 1" through 6" of the selected space. Thus, this particular device 12 can make calculations over a range of widths of six inches of spece in which a reproduction is to fit, but the device can be made larger or smaller to cover a range greater or less than that.

The particular element of the set 18 selected for use in computing the magnification value is indicated by aligning that element with a reference indicator 19, which could simply be a window 21 in the main member 16. The setting can be more accurate if the reference indicator 19 includes a cursor 22 to be aligned with the specific value in the indicia 18.

The size, and more specifically in this instance, the width, of the portion 13 is measured between two edge indicators 23 and 24 that are parallel to each other and perpendicular to the main member 16. One of these edge indicators 23 is held at a fixed position relative to the longitudinal dimension of the main member 16, for example by means of several screws 26. The intersection between the upper edge 27 of the main member 16 and the left-hand edge 28 (the edge that faces the far end 29) of edge indicator 23 constitutes the origin from which measurements of the width and, if desired, the height of the portion 13 are made. In this embodiment, both of the edges 27 and 28 are calibrated in quarter-inches, starting at the origin.

The edge indicator 24 is movable in two directions: longitudinally along the main member 16 and laterally, or perpendicularly, to that direction. The movable edge indicator is a flat, L-shaped structure that comprises one branch 29 slidably mounted in mounting means 31 that is, itself, slidably mounted on the main member 16. The other branch 32 extends perpendicularly to the branch 29 and overlaps the fixed edge indicator 23.

The mounting means 31 has four screws 33-36 or other means to hold its corners together to permit the means 31 to slide longitudinally in the mounting means. This arrangement requires that screws 35 and 36 be closer to the fixed edge indicator 23 than is the edge 37 of the movable edge indicator 24. This causes the corner 38 of the mounting means 31 in which the screw 35 is located to extend beyond the edge 37, but it is the edge 37, not the corner 38, that is used in measuring the width of the portion 13, and so a notch 39 is cut deeply enough into the mounting means 31 to allow numbers that form a second set of indicia 42 printed on the second member 17 of the slide rule 14 to be read.

The second set of indicia are, in this embodiment, numbers aligned with each of the quarter-inch marks on the scale 43 along the edge 27. Only a few of the elements of the second indicia 42 are shown in FIG. 1 in order not to clutter that portion of the drawing. If desired, as in this embodiment, a transparent cover 44 carrying a cursor 46 can be included in the otherwise opaque mounting means to help identify which number in the set 42 corresponds to the location of the edge 37 of the movable edge indicator 24 relative to the edge 28 of the fixed edge indicator 23. Each number in the second set of indicia is the quotient obtained by dividing a first number (the selected dimension, which has been indicated as the horizontal width, of a chosen space on a page in which a reproduction of portion 13 is to be printed) by a second number (the actual value of the corresponding dimension, i.e. the horizontal width, of the portion 13). The number shown aligned with the cursor 46 is the number "0.44", which is the quotient obtained by dividing the dimensional value of 3", represented by the number "3" in the window 21, by the distance value 6.75", which is the distance between the edges 28 and 37 of the fixed edge indicator 23 and the movable edge indicator 24, respectively, for the portion 13 shown in FIG. 1. This quotient represents the magnification value by which the portion 13 would have to be magnified to fit neatly into a space 3" wide.

It will be noted that the set of indicia 42 shown in FIG. 1 is a row of numbers printed on the front surface of the member 17 at an angle θ to the longitudinal direction of that member and that this row of numbers is visible through a window 47 that is also inclined at the same angle θ. In this row of numbers, the number farthest to the right and within the window 47 is "12". That number is aligned with the first mark one-fourth inch to the left of the zero position, or origin, of the scale 43. The set 42 really includes a number aligned with each quarter-inch mark, but only a few are shown in FIG. 1 to make the drawing easier to read. Each number visible in the window 47 when the member 17 is set so that the number "3" is visible in the window 21 has the value obtained by dividing "3" by the distance between the origin of the scale 43 and the quarter-inch mark aligned with that number. Thus, ""12" is obtained by dividing "3" by "¼". That is the magnification value required to enlarge a portion of artwork only one-fourth inch wide to fill a space 3" in width.

FIG. 2 shows a modification of the device 12 in FIG. 1 to allow all of the elements of the first set of indicia 48 to be printed on the front surface of a revised main member 49 so that all of these indicia are visible at all times instead of one at a time. In order to indicate which element of the set is being used in calculating the magnification value, a cursor 51 in the form of an arrow is printed on the front surface of the second member 52 to be visible through a wide window 53 that extends under all of the indicia 48. This makes it easy to use not only integers, corresponding to integral values of the selected width, i.e., 1", 2", 3", etc., but intermediate values. Thus, non-numerical indicia corresponding to fractions of an inch, or other basic units of measure, represented by the integers are included in the indicia 48.

Figure 5:
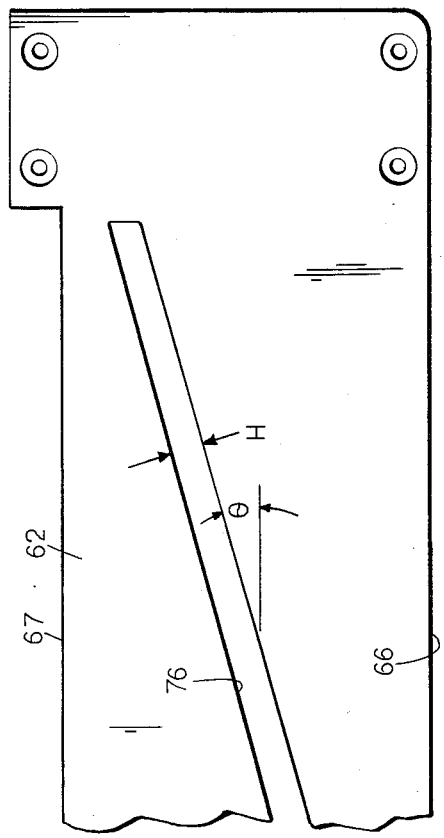
FIG. 5 shows a cover for the main slide rule member in FIG. 4.
Figure 3:
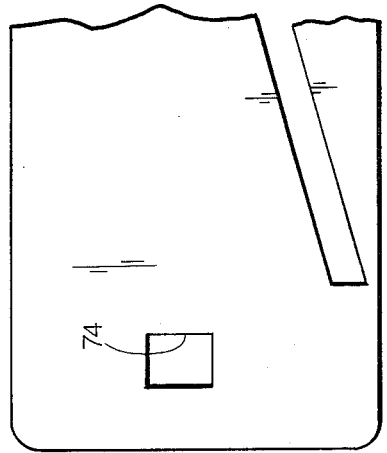
FIG. 3 shows an end view of a modification of the device in FIG. 1.

FIGS. 3–5 all relate to a second embodiment 54 of the device 12 in FIG. 1, although not all parts of the embodiment 54 are illustrated. For example, a fixed edge indicator 56 is shown, at least in part, but no part of a movable edge indicator is shown. That allows the inner part of the slide rule portion 57 to be seen more completely in the drawing. When assembled for use, the embodiment 54 could include the movable edge indicator 24 of FIG. 1, for example.

The slide rule portion comprises a main member 58 with a wide, shallow channel 59 in which is a second member 61 that slidably fits the channel. An opaque cover 62 for the channel 59 is shown in FIG. 5 and may be affixed to the main member by any suitable means so as to rest on a pair of elongated support pads 63 and 64 that define opposite sides of the channel 59. The edges 66 and 67 of the cover extend beyond the pads 63 and 64 to form, with step sections 68 and 69 on the main member, a pair of guides in which a support, such as the mounting means 31 in FIG. 1 for the movable edge indicator may be slidably retained.

FIG. 4 shows a first set of indicia 71 comprising four integers "1" through "4" equally spaced apart by a distance X in the longitudinal direction of the slide 61. The indicia 71, also include lines spaced midway between the integers. A second set of indicia 72 is also printed on the front surface of the slide 61 to form an array of numbers lined up in slanting rows 73, each at an angle θ with respect to the longitudinal direction of the slide rule members 58 and 61. Not only are the numbers 72 arranged in rows, they are also placed in columns, which, in this embodiment, are perpendicular to the longitudinal direction of the members 58 and 61. Each column has a width S, and there are, in this embodiment, four columns to the inch, corresponding to the fact the numbers in each column are the quotients of one of the indicia in the first set 71 divided by the distance between the fixed edge indicator 56 and the quarter-inch mark aligned with that column.

It will be noted that only four rows 73 of numbers 72 are shown and that each row extends over a longitudinal distance of about 6.75". Windows 74 and 76 in the opaque cover 62 in FIG. 5 are shown in phantom lines in FIG. 4 to indicate the locations they would occupy if the cover 62 were positioned on the pads 63 and 64. The slide 61 happens to be placed so that the number "2" in the set 71 is aligned with the window 74, which means that the second row 73 of the indicia 72 must be aligned with the window 76. The rows are offset from each other in the longitudinal direction by the same distance X as the integers in the first set of indicia 71 so that the numbers in each row are magnification values associated with a specific integer in the set 71.

While the rows 73 in this embodiment relate only to integer values of the indicia 71, it is possible to insert additional rows corresponding to any non-integral values of the indicia 71 by spacing the rows 73 apart far enough in the vertical direction to insert one or more additional rows. This might make it necessary to make both the members 58 and 61 wider or the numerals in the rows 73 smaller or both. In addition, the numbers shown in the array 72 are based on quarter-inch increments of distance from the zero point, or origin, 77 of a scale 78 along the upper edge 79 of the main member 58, but if other increments, for example one-sixth of of an inch, were used, the numbers in the array 72 would have to be recalculated accordingly. Whatever the number of rows 73, the distance X between adjacent rows would have to be the same as the distance between the two indicia in the set 71 corresponding to those two rows.

In selecting the angle θ it is necessary to allow sufficient distance between rows 73, measured in the direction perpendicular to the rows, to provide room for legible numbers in the indicia 72. An angle θ having a value between about 8° and 20°, and preferably between about 10° to 13° is satisfactory to allow the numbers to be spread far enough apart along the rows and perpendicularly thereto to be legible.

The magnification numbers in the set 72 are calculated for a maximum artwork width of 6.75", but this invention is not limited to that amount. The maximum value could be increased, but either the angle θ would have to be made smaller or the width of the slide rule members 58 and 61 would have to be made greater, or both.

The fixed edge indicator 56 has an offset 81 that allows the lower surface 82 of its main part to lie flat on the surface of the artwork, even in the region near the edge of the main member 58, instead of being suspended over the artwork in that region, as is true of the fixed edge indicator 23 in FIG. 1. Anyone using the embodiment 54 can, therefore, see more precisely where the edge indicator 56 is placed on the artwork. To allow the user to determine even more precisely the measurements of the portion of the artwork to be reproduced, the part of the fixed edge indicator adjacent the edge 83 is beveled and has a measuring scale 84 printed on it.

The part of the main member 58 adjacent the edge 79 is also beveled to bring the scale 78 closer to the artwork.

FIGS. 6–8 show a device 86 that constitutes yet another embodiment of the invention. The device 86 includes a slide rule portion 87 that has a main member 88 and a second member 89 longitudinally movable with respect to the main member. The second member is essentially a slide, but since it should only occupy those positions that bring indicia of a first set 91 into alignment with a cursor 92 alongside a window 93, the members have a detent arrangement to make it easier to move the indicia into their proper positions. The detent arrangement includes a knob 94 resiliently biased by a spring 96 and held in a recess 97 in the main member 88. The knob is resiliently pressed against one edge 98 of the slide 89 so that it can enter the appropriate one of a series of notches 99 in that edge. Each of the notches corresponds to one element of the set of indicia 91, and entry of the knob into the notch restrains the slide from moving to any other position unless a noticeable longitudinal force is applied to the slide 89.

It will be noted that the indicia 91 include both numerical and intermediate values and that they are calibrated in picas, a unit of measure common in the printing industry and equal to one-sixth of an inch. The window 93 in which the indicia are viewed to tell the setting of the slide 89 relative to the main member 88 is too wide to be used by itself as the equivalent of a cursor, and so a cursor 92 is printed on the front surface of an opaque cover 101 that forms part of the main member. The reason the window is so wide is to allow more than one of the indicia 91 to be seen at a time since those indicia that are not integral multiples of an inch hve no numerical indications of their values, and it is desirable to have at least one numerical value visible in the window, even if that value is not the element of the set that happens to be aligned with the cursor 92.

As a matter of fact, if the device 86 includes the detent knob 94 and notches 99, the cursor 92 is not really necessary, since the slide 89 can be placed in any of its specific positions by detent operation, alone, and even with a wide window 93, the specific element representative of the position of the slide can easily be recognized. Thus, the detent structure can be considered to be a reference indicator of the specific element of the indicia 91 corresponding to the position of the slide 89 relative to the main member 88.

The device 86 includes two edge indicators 102 and 103. As in the embodiments in FIG. 1 and 4, the edge indicator on the right happens to be the one that remains in a fixed position relative to the longitudinal direction of the slide rule structure 87 and is, therefore, referred to as the fixed edge indicator, but unlike the other embodiments, the position of the indicator 102 may be fixed only in that respect; it may be attached to the main member by means that allow the indicator 102 to slide in its own longitudinal direction, which is perpendicular to the longitudinal diretion of the main member 88. As a result, it is unnecessary for the movable member 103 to move both longitudinally and transversely with respect to the main member; it can be supported in such a way that it will slide only longitudinally along the main member. The interengagement of the edge indicator 103 with the main member 88 is best shown in FIG. 7. The edge indicator has grooves 104 and 106, one of which is engaged by a tongue 107 at the end of the main member and the other of which is engaged by a tongue 108 that extends toward the member from offsets 109 and 111 projecting from the cover 101. Actually, the tongue 108 is divided into two parts, one on each of the offsets 109 and 111 that straddle the slide 89, as shown best in FIG. 6.

The portion of the fixed indicator 102 adjacent the edge 112 that faces the other edge indicator 103 may be beveled to give a better view of the artwork, but since the edge indicator may slide in the guides defined by the tongues 107 and 108, it is inappropriate to print a calibrated scale on the beveled portion adjacent the edge 112. Instead, since the movable edge indicator 103 is arranged to move only longitudinally and not laterally, or perpendicularly, with respect to the main member 88, a scale 113 can be printed on a beveled portion of the indicator adjacent the edge 114 facing the fixed edge indicator 102.

The main member 88 can also be beveled adjacent its edge 116, which is to be placed along one edge of the artwork, and a scale 117 may be printed on the beveled surface. As in the other embodiments, the zero point 118 of the scale is aligned with the edge 112 of the fixed edge indicator 102.

It will be noted that both of the scales 113 and 117 are calibrated in picas, as is the set of indicia 91, although it is not necessary that the spacings of the indicia 91 be based on the same increments as the scale 117. What is important is that the ratio of the dimension of a selected space, as represented by the setting of the slide 89 relative to the main member, to the distance between the proximal edges 112 and 114 of the edge indicators be indicated in a second set of indicia 119. As in the embodiments discussed previously, the second set of indicia is in the form of an array of numbers printed on the front surface of the slide 89 in slanting rows of which only one row is visible through a window 121 in the cover 101.

The numbers forming the indicia 119 are, in fact, calculated in increments of one-sixth of an inch. However, the numbers are not directly aligned under the marks to which they relate on the scale 117. Specifically, the slide 89 is set to calculate the magnification value necessary to print a reproduction of artwork in a space 18 picas wide. The first number at the right-hand end of the visible row of indicia 119 is computed by dividing 18 picas by one pica, which is the distance between the zero point 118 and the first mark to the left of the zero point. However, the number "18" is not located directly under the first mark to the left of the zero point but is somewhat to the left of that location. The distance by which the number "18", and all the other magnification values in the indicia 119, are offset to the left of alignment with their respective marks on the scale 117 is determined by the distance of a window 122 in the movable edge indicator 103 is to the left of the edge 114 of that indicator. The window 122 is the equivalent of a cursor, but it has the advantage that only a single one of the indicia 119 can be seen at any one time within the open space created by the intersection of the windows 121 and 122. In the present example, the number "2.3" in that open space is the approximate magnification value required to print artwork eight picas wide (as indicated by the setting of the edge 114 relative to the scale 117) in a space 18 picas wide.

Calibrating the magnification values in terms of picas causes the numbers in the set of indicia 119 to be closer together than in the embodiment in FIG. 4 in which the magnification values were spaced one-fourth of an inch apart. Thus, the more closely spaced magnification values in the set of indicia 119 may have to be approximated to no more than two digits. In order to avoid the confusion resulting when two adjacent two-digit values would be the same, a "+" mark may be used to distinguish them. For example, the magnification values obtained by dividing 18 picas by 16, 17, and 18 picas would be, to four-digit accuracy, "1.125", "1.058" and "1.000". If they were printed to two-digit accuracy as members of the set of indicia 119, they would appear as "1.1", "1.1", and "1.0". In order to minimize clutter, they are shown in FIG. 6 as being printed as "1.1", "1+", and "1". Any other way of indicating a slightly higher or lower value for one of the numbers that would otherwise be idintical could be used, if desired.

The means of slidably attaching the movable edge indicator 103 to the main member 88 is shown best in FIG. 8. There are two grooves 123 and 124 formed along opposite edges of the main member 88 by steps 126 and 127 in the main member and edge portions 128 and 129 of the cover 101. The indicator 103 has inwardly directed tongue 131 and 132 that fit into those grooves to hold the indicator in place and to guide it on the main member 88. The edge indicator 103 also has an offset 133, the lower surface of which conforms to the juxtaposed surface of the member 88 in this embodiment. As a result, the bottom surface 134 of the movable edge indicator 103 can lie directly on the artwork without a gap therebetween at any point. In fact, all three edges 112, 114, and 116 in this embodiment can lie directly on the artwork to provide the best possible view of the portion to be reproduced.

A framing member 136 that can be set to complete the framing of the selected portion of the artwork is also provided, although in the simplest embodiment of this invention it would not be needed and only vestigial lengths of the edge indicators 103 and 102 would be needed. The framing member could be slidably supported on either of the edge indicators 102 or 103 to slide therealong toward and away from the main member while remaining parallel thereto. Alternatively, it could be rigidly attached to the fixed edge indicator, if that indicator were slidably mounted in the main member 88, as has been discussed in connection with FIGS. 6–8. The framing member 136 could be fixedly attached at or near the free end of the fixed edge indicator, as shown in FIG. 6, or it could be provided with tongues to engage the grooves 104 and 106 in the edge indicator 102 in the same way that the tongues 131 and 132 engage the grooves 123 and 124. The framing member 136 can also be provided with a step 137 so that its lower surface will rest on the upper, or front, surface of the movable edge indicator 103 and parallel to, although spaced from, the artwork.

While the invention has been described in specific terms, it will be obvious to those skilled in the art that modifications may be made therein without departing from the true scope of the invention as defined by the following claims.

What is claimed is:

1. A device for calculating the magnification value required to enlarge or reduce a selected portion of graphic artwork from the initial size thereof to a selected size for reproduction of the selected portion, said device comprising:
   (a) an elongated main member;
   (b) a first edge indicator on the main member to be aligned with a first edge of the selected portion of the graphic artwork to be reproduced;
   (c) a movable second edge indicator mounted on the main member to be aligned with the opposite edge of the selected portion, whereby the distance between the first edge indicator and the second edge indicator is a measure of the size of one dimension of the selected portion between the first edge and the opposite edge;
   (d) an elongated second member movable longitudinally relative to the main member;
   (e) a first reference indicator on one of the members;
   (f) a first set of indicia elements extending along the other of the members and representing dimensional values to which the one dimension of the selected portion of the artwork is to be changed by magnification, each of the elements of the first set of indicia being selectively settable relative to the reference indicator;
   (g) a second set of indicia elements extending along the second member and representing magnification values by which the one dimension of the selected portion of the artwork is to be magnified to correspond to the selected one of the dimension values of the first set of indicia aligned with thereference indicator; and
   (h) a second reference indicator attached to the second edge indicator to move therewith and to point to a specific magnification value in the second set of indicia.

2. The device of claim 1 in which the magnification values in the second set include values greater than 1 for enlargement of the selected portion of the graphic artwork and values less than 1 for reduction of the selected portion of the artwork 3. The device of claim 1 in which the second set of indicia elements comprises a plurality of arrays of numbers representing the magnification values, each of the arrays corresponding to a respective one of the members of the first set of indicia.

4. The device of claim 3 in which the main member includes a window delineator within which a particular one of the plurality of arrays of numbers will be placed when the respective element of the first set of indicia elements is aligned with the first reference indicator.

5. The device of claim 4 in which regions of the main member adjacent the window delineator are opaque, whereby the only one of the arrays of numbers visible at any time is the array corresponding to the selected element of the first set of aligned with the first reference indicator.

6. The device of claim 3 in which each of the arrays of numbers is a straight row tilted at an angle $\theta$ relative to the longitudinal direction of the second member.

7. The device of claim 6 in which the distance, measured perpendicular to the rows, between corresponding points on two adjacent rows is $X \sin \theta$, where X is the distance between adjacent elements of the first set of indicia elements.

8. The device of claim 7 in which the main member comprises a window through which is visible only the one row of numbers making up the second set of indicia corresponding to the element of the first set of indicia alinged with the first reference indicator, two opposing sides of the window being straight and parallel to each other and extending at least part of the way across the main member and the same angle $\theta$ to the longitudinal direction thereof, the height of the window in the direction perpendicular to said opposing sides being greater than the height of the numbers in that direction and not greater than X sin $\theta$.

9. The device of claim 1 in which the second member is a slide smoothly slidable longitudinally relative to the main member, and the main member and the slide comprise interengaging means to hold the members together to allow only longitudinal movement therebetween.

10. The device of claim 1 in which the first edge indicator extends perpendicularly to the main member and is rigidly attached thereto.

11. The device of claim 10 in which the second edge indicator extends perpendicularly to the main member and parallel to the first edge indicator 12. The device of claim 11 comprising a framing member extending parallel to the main member and attached to at least one of the edge indicators and movable toward and away from the main member while keeping parallel thereto, whereby the main member, the first and second edge indicators and the framing member comprise an adjustable frame that can be adjusted around the selected portion of the graphic artwork.

13. The device of claim 12 in which at least one of the edge indicators comprises a set of markings forming a measuring scale.

14. The device of claim 13 in which the main member comprises a second set of markings forming a second measuring scale, each of said scales having zero points at the intersection of the main member and the first edge indicator.

15. The device of claim 12 in which the framing member is rigidly attached to the second edge indicator and the device comprises slidable mounting means slidable attaching the second edge indicator to the main member to permit the second edge indicator to slide both longitudinally and transversely relative to the main member.

16. The device of claim 12 comprising sliding attachment means attaching the framing member to the first edge indicator to permit the framing member to slide both longitudinally relative to the first edge indicator while remaining perpendicular thereto.

17. A magnification calculator for graphic reproduction, said calculator comprising:
(a) an elongated main member comprising first and second edge indicators, the second edge indicator being slidably movable longitidunally along the main member toward and away from the first edge indicator to be set to the actual dimension between opposite edges of that part of graphic artwork to be reproduced;
(b) an elongated slide member slidably supported by the main member and extending longitudinally along the main member;
(c) a calibrated scale on one of the members and a first cursor on the other of the members to indicate, on the calibrated scale, a selected one of a range of desired dimensions within which a graphic reproduction of a selected portion of the artwork is to fit;
(d) an array of magnification numbers on the slide member to correspond to the numerical magnification of a range of the actual dimensions to fit into the desired dimensions; and
(e) a second cursor attached to the second edge indicator to indicate on the array the specific number by which the part of the graphic artwork to be reproduced must be magnified to fit within the desired distance.

18. The magnification calculator of claim 17 in which the first edge indicator is a first elongated bar rigidly attached to the measuring member, and the second edge indicator is a second elongated bar slidably mounted on the main member and extending perpendicularly therefrom and parallel to the first elongated bar.

19. The magnification calculator of claim 18 comprising a framing member slidably mounted on both of the edge indicators to slide in the longitudinal direction of the edge indicators and to remain substantially parallel to the main member.

20. A device for calculating the magnification value required to enlarge or reduce a selected portion of graphic artwork from the initial size thereof to a selected size for reproduction of the selected portion, said device comprising:
(a) an elongated main member;
(b) an elongated second member movable longitudinally to at least a plurality of specific positions along the main member;
(c) a first reference indicator on one of the members;
(d) a first set of indicia elements extending along the other member at locations corresponding, respectively, to said specific positions and representing dimensional values to which one dimension of the selected portion of the artwork is to be changed by magnification, each of the elements of the first set of indicia being selectively settable relative to the first reference indicator;
(e) a second set of indicia elements extending along the second member and representing magnification values by which the selected portion of the artwork is to be magnified so that one dimension thereof will correspond to the selected one of the dimensional values of the first set of indicia aligned with the first reference indicator;
(f) a first edge indicator located at a predetermined longitudinal location on the main member to be aligned with a first edge of the selected portion of the artwork to be reproduced;
(g) a second edge indicator movably mounted on the main member to be moved longitudinally therealong, whereby the second edge indicator may be aligned with the opposite edge of the selected portion and the distance between the first edge indicator and the second edge indicator is a measure of the dimensional value of said one dimension of the selected portion between the first and opposite edges thereof; and
(h) a second reference indicator located on the second edge indicator to move therewith and to point to a specific value in the second set of indicia elements for each incremental position of the second edge indicator along the main member.

* * * * *